(12) United States Patent
Blin et al.

(10) Patent No.: US 12,712,571 B2
(45) Date of Patent: Aug. 18, 2026

(54) RADIO FREQUENCY SWITCH FOR SIMPLIFIED LAYOUT OF PHASE SHIFTER USING SWITCHED DELAY LINES

(71) Applicant: Skyworks Solutions, Inc., Irvine, CA (US)

(72) Inventors: Guillaume Alexandre Blin, Carlisle, MA (US); Grant Darcy Poulin, Carp (CA)

(73) Assignee: Skyworks Solutions, Inc., Irvine, CA (US)

(*) Notice: Subject to any disclaimer, the term of this patent is extended or adjusted under 35 U.S.C. 154(b) by 701 days.

(21) Appl. No.: 18/163,184

(22) Filed: Feb. 1, 2023

(65) Prior Publication Data

US 2023/0253991 A1 Aug. 10, 2023

Related U.S. Application Data

(60) Provisional application No. 63/306,191, filed on Feb. 3, 2022.

(51) Int. Cl.

| | |
|---|---|
| ***H04B 1/00*** | (2006.01) |
| ***H04B 1/16*** | (2006.01) |
| ***H04B 1/18*** | (2006.01) |

(52) U.S. Cl.
CPC ........... *H04B 1/006* (2013.01); *H04B 1/1607* (2013.01); *H04B 1/18* (2013.01)

(58) Field of Classification Search
CPC ...... H04B 10/40; H04B 10/2914; H04B 1/18; H04B 1/40; H04B 10/43; H04B 10/503; H04B 10/505; H04B 10/541; H04B 10/548; H04B 10/60; H04B 10/25891; H04B 10/29; H04B 10/50; H04B 10/5053; H04B 10/564; H04B 10/614; H04B 1/006; H04B 1/0064; H04B 1/1027; H04B 1/30; H04B 10/25; H04B 1/005
USPC ........................................................ 455/552.1
See application file for complete search history.

(56) References Cited

U.S. PATENT DOCUMENTS

| | | | | |
|---|---|---|---|---|
| 6,515,507 B1 * | 2/2003 | Patel | ...................... | G11C 16/20 326/38 |
| 2016/0191085 A1 * | 6/2016 | Kasnavi | ............... | H04B 1/0475 455/78 |
| 2022/0376443 A1 * | 11/2022 | Gao | ..................... | H05K 1/0228 |

* cited by examiner

*Primary Examiner* — Ajibola A Akinyemi
(74) *Attorney, Agent, or Firm* — Knobbe, Martens, Olson & Bear, LLP

(57) ABSTRACT

A device may include an input port configured to receive the RF signal, the input port being positioned on a first side of the RF switching circuit; a control port configured to receive a control signal indicating a trace through which the RF signal is routed, the control port being positioned on a second side of the RF switching circuit opposite to the first side. The device may further include a plurality of switching pins configured to be coupled to a plurality of traces, a first half of the plurality of switching pins being positioned on one adjacent side of the RF input, and a second half of the plurality of switching pins being positioned on the other adjacent side of the RF input. The device may also include a controller configured to route the RF signal according to the control signal by reference to a truth table.

20 Claims, 10 Drawing Sheets

RADIO FREQUENCY SWITCH FOR SIMPLIFIED LAYOUT OF PHASE SHIFTER USING SWITCHED DELAY LINES

INCORPORATION BY REFERENCE TO ANY PRIORITY APPLICATIONS

This application claims priority to U.S. Provisional Application No. 63/306,191, filed on Feb. 3, 2022 and titled "RADIO FREQUENCY SWITCH FOR SIMPLIFIED LAYOUT OF PHASE SHIFTER USING SWITCHED DELAY LINES," the disclosure of which is hereby incorporated by reference in its entirety for all purposes. Any and all applications for which a foreign or domestic priority claim is identified in the Application Data Sheet as filed with the present application are hereby incorporated by reference under 37 CFR 1.57.

BACKGROUND

Field

Embodiments of the invention relate to electronic systems, and in particular, to RF switches for use in radio frequency (RF) electronics.

Description of the Related Technology

A radio frequency (RF) communication system can include a transceiver, a front end, and one or more antennas for wirelessly transmitting and receiving signals. The front end can include low noise amplifier(s) for amplifying signals received via the antenna(s), and power amplifier(s) for boosting signals for transmission via the antenna(s).

Examples of RF communication systems with one or more power amplifiers include, but are not limited to, mobile phones, tablets, base stations, network access points, customer-premises equipment (CPE), laptops, and wearable electronics. For example, in wireless devices that communicate using a cellular standard, a wireless local area network (WLAN) standard, and/or any other suitable communication standard, a power amplifier can be used for RF signal amplification. An RF signal can have a frequency in the range of about 30 kHz to 300 GHz, such as in the range of about 410 MHz to about 7.125 GHz for certain communications standards.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

In some aspects, the techniques described herein relate to a radio frequency (RF) switching circuit configured to route a RF signal including: an input port configured to receive the RF signal, the input port being positioned on a first side of the RF switching circuit; a control port configured to receive a control signal indicating a trace through which the RF signal is routed, the control port being positioned on a second side of the RF switching circuit opposite to the first side; a plurality of switching pins configured to be coupled to a plurality of traces, a first half of the plurality of switching pins being positioned on one adjacent side of the RF input, and a second half of the plurality of switching pins being positioned on the other adjacent side of the RF input; and a controller configured to route the RF signal according to the control signal by reference to a truth table.

In some aspects, the techniques described herein relate to a radio frequency (RF) switch module configured to receive an RF signal and provide a tuned version of the RF signal including: an input circuit configured to receive the RF signal and route the RF signal to a path determined based on a control signal that is received via a first control port positioned on the input circuit; an output circuit configured to detect the RF signal transmitted through the path based on the control signal that is received via a second control port positioned on the output circuit and output the tuned version of the RF signal, the second control port being coupled to the first control port such that the control signal is applied to both the first control port and the second control port; and a plurality of traces configured to provide each path through which the RF signal is transmitted from the input circuit to the output circuit.

In some aspects, the techniques described herein relate to a RF switch module wherein each of the first control port and the second control port includes a plurality of control pins, and each control pin of the first control port is coupled to a corresponding control pin of the second control port respectively without crossing of coupling lines on a printed board or other routing assembly on which the RF switch module is assembled.

In some aspects, the techniques described herein relate to a RF switch module wherein the control signal includes a plurality of binary values, each of which is applied to one of the control pins of the first control port and a corresponding control pin of the second control port.

In some aspects, the techniques described herein relate to a RF switch module wherein a number of control pins of the first control port and the second control port is determined based on a number of the plurality of traces.

In some aspects, the techniques described herein relate to a RF switch module wherein the path through which the RF signal is transmitted from the input circuit to the output circuit is determined by a combination of the plurality of binary values by reference to at least one truth table.

In some aspects, the techniques described herein relate to a RF switch module wherein each of the first control port and the second control port further includes a selection pin that is configured to select a specific truth table.

In some aspects, the techniques described herein relate to a RF switch module wherein each of the input circuit and the output circuit further includes at least one power supply pin in case the first control port and the second control port do not receive power supply directly.

In some aspects, the techniques described herein relate to a RF switch module wherein each of the input circuit and output circuit includes a plurality of switching pins to which the plurality of traces is connected, a first half of the switching pins is positioned in series on an opposite side of the input circuit to a second half of the switching pins.

In some aspects, the techniques described herein relate to a RF switch module wherein the plurality of traces is configured to connect each of the switching pins of the input circuit with a corresponding switching pin without crossing of the plurality of traces on a printed board or other routing assembly on which the RF switch module is assembled In some aspects, the techniques described herein relate to a front-end module including: a packaging substrate configured to receive a plurality of components; a RF switch implemented on the packaging substrate, the RF switch including an input circuit configured to receive the RF signal and route the RF signal to a path determined based on a control signal that is received via a first control port positioned on the input circuit, an output circuit configured to detect the RF signal transmitted through the path based on the control signal that is received via a second control port positioned on the output circuit and output the tuned version of the RF signal, the second control port being coupled to the first control port such that the control signal is applied to both the first control port and the second control port, and a plurality of traces configured to provide each path through which the RF signal is transmitted from the input circuit to the output circuit.

In some aspects, the techniques described herein relate to a front-end module wherein each of the first control port and the second control port includes a plurality of control pins, and each control pin of the first control port is coupled to a corresponding control pin of the second control port respectively without crossing of coupling lines.

In some aspects, the techniques described herein relate to a front-end module wherein the control signal includes a plurality of binary values, each of which is applied to one of the control pins of the first control port and a corresponding control pin of the second control port.

In some aspects, the techniques described herein relate to a front-end module wherein a number of control pins of the first control port and the second control port is determined based on a number of the plurality of traces.

In some aspects, the techniques described herein relate to a front-end module wherein the path through which the RF signal is transmitted from the input circuit to the output circuit is determined by a combination of the plurality of binary values by reference to at least one truth table.

In some aspects, the techniques described herein relate to a front-end module wherein each of the first control port and the second control port further includes a selection pin that is configured to select a specific truth table.

In some aspects, the techniques described herein relate to a front-end module wherein each of the input circuit and the output circuit further includes at least one power supply pin in case the first control port and the second control port do not receive power supply directly.

In some aspects, the techniques described herein relate to a front-end module wherein each of the input circuit and output circuit includes a plurality of switching pins to which the plurality of traces is connected, a first half of the switching pins is positioned in series on an opposite side of the input circuit to a second half of the switching pins.

In some aspects, the techniques described herein relate to a front-end module wherein the plurality of traces is configured to connect each of the switching pins of the input circuit with a corresponding switching pin without crossing of the plurality of traces.

In some aspects, the techniques described herein relate to a base station including: a transceiver configured to generate a radio frequency (RF) signal; a power amplifier configured to amplify the RF signal; an antenna; and a RF switch configured to selectively electrically connect an output of the power amplifier to the antenna, the RF switch including an input circuit configured to receive the RF signal and route the RF signal to a path determined based on a control signal that is received via a first control port positioned on the input circuit, an output circuit configured to detect the RF signal transmitted through the path based on the control signal that is received via a second control port positioned on the output circuit and output the tuned version of the RF signal, the second control port being coupled to the first control port such that the control signal is applied to both the first control port and the second control port, and a plurality of traces configured to provide each path through which the RF signal is transmitted from the input circuit to the output circuit.

In some aspects, the techniques described herein relate to a base station wherein each of the first control port and the second control port includes a plurality of control pins, and each control pin of the first control port is coupled to a corresponding control pin of the second control port respectively without crossing of coupling lines.

In some aspects, the techniques described herein relate to a base station wherein the control signal includes a plurality of binary values, each of which is applied to one of the control pins of the first control port and a corresponding control pin of the second control port.

In some aspects, the techniques described herein relate to a base station wherein a number of control pins of the first control port and the second control port is determined based on a number of the plurality of traces.

In some aspects, the techniques described herein relate to a base station wherein the path through which the RF signal is transmitted from the input circuit to the output circuit is determined by a combination of the plurality of binary values by reference to at least one truth table.

In some aspects, the techniques described herein relate to a base station wherein each of the first control port and the second control port further includes a selection pin that is configured to select a specific truth table.

In some aspects, the techniques described herein relate to a base station wherein each of the input circuit and the output circuit further includes at least one power supply pin in case the first control port and the second control port do not receive power supply directly.

In some aspects, the techniques described herein relate to a base station wherein each of the input circuit and output circuit includes a plurality of switching pins to which the plurality of traces is connected, a first half of the switching pins is positioned in series on an opposite side of the input circuit to a second half of the switching pins.

In some aspects, the techniques described herein relate to a base station wherein the plurality of traces is configured to connect each of the switching pins of the input circuit with a corresponding switching pin without crossing of the plurality of traces.

In some aspects, the techniques described herein relate to a radio frequency switch module configured to receive a radio frequency signal and provide a tuned version of the radio frequency signal, the radio frequency switch module including: an input circuit configured to receive the radio frequency signal and route the radio frequency signal to a path determined based at least in part on a control signal received via a first control port of the input circuit; an output circuit configured to detect the radio frequency signal transmitted through the path based at least in part on the control signal that is received via a second control port of the output circuit and output the tuned version of the radio frequency signal, the second control port being electrically coupled to the first control port such that the control signal is applied to both the first control port and the second control port; and a plurality of traces configured to provide a plurality of paths configured to transmit radio frequency signals between the input circuit and the output circuit, the plurality of paths including the path determined based at least in part on the control signal.

In some aspects, the techniques described herein relate to a radio frequency switch module wherein each of the first control port and the second control port includes a plurality of control pins, and each control pin of the first control port is electrically coupled to a corresponding control pin of the second control port respectively without traces of the plurality of traces overlapping.

In some aspects, the techniques described herein relate to a radio frequency switch module wherein the control signal includes a plurality of binary values, each of which is applied to one of the plurality of control pins of the first control port and a corresponding control pin of the plurality of control pins of the second control port.

In some aspects, the techniques described herein relate to a radio frequency switch module wherein the path through which the radio frequency signal is transmitted from the input circuit to the output circuit is determined by a combination of the plurality of binary values defined in a truth table.

In some aspects, the techniques described herein relate to a radio frequency switch module wherein each of the first control port and the second control port further includes a selection pin that is configured to select the truth table from a plurality of truth tables.

In some aspects, the techniques described herein relate to a radio frequency switch module wherein a number of control pins of the first control port and the second control port corresponds to a number of the plurality of traces.

In some aspects, the techniques described herein relate to a radio frequency switch module wherein each of the input circuit and the output circuit further includes at least one power supply pin.

In some aspects, the techniques described herein relate to a radio frequency switch module wherein each of the input circuit and the output circuit includes a plurality of switching pins to which the plurality of traces is connected, a first portion of the plurality of switching pins is positioned in series on a first side of the input circuit that is opposite to a second side of the input circuit that includes a second portion of the plurality of switching pins.

In some aspects, the techniques described herein relate to a radio frequency switch module wherein the plurality of traces is configured to connect each of the plurality of switching pins of the input circuit with a corresponding switching pin of the plurality of switching pins of the output circuit without traces of the plurality of traces overlapping.

In some aspects, the techniques described herein relate to a front-end module including: a packaging substrate configured to receive a plurality of components; and a radio frequency switch implemented on the packaging substrate, the radio frequency switch including an input circuit configured to receive a radio frequency signal and route the radio frequency signal to a path determined based at least in part on a control signal received via a first control port of the input circuit, an output circuit configured to detect the radio frequency signal transmitted through the path based at least in part on the control signal received via a second control port of the output circuit and output a tuned version of the radio frequency signal, the second control port being electrically coupled to the first control port such that the control signal is applied to both the first control port and the second control port, and a plurality of traces configured to provide a plurality of paths configured to transmit radio frequency signals between the input circuit and the output circuit, the plurality of paths including the path determined based at least in part on the control signal.

In some aspects, the techniques described herein relate to a front-end module wherein each of the first control port and the second control port includes a plurality of control pins, and each control pin of the first control port is electrically coupled to a corresponding control pin of the second control port respectively without traces of the plurality of traces overlapping.

In some aspects, the techniques described herein relate to a front-end module wherein the control signal includes a plurality of binary values, each of which is applied to one of the plurality of control pins of the first control port and a corresponding control pin of the plurality of control pins of the second control port.

In some aspects, the techniques described herein relate to a front-end module wherein the path through which the radio frequency signal is transmitted from the input circuit to the output circuit is determined by a combination of the plurality of binary values specified in a truth table.

In some aspects, the techniques described herein relate to a front-end module wherein each of the first control port and the second control port further includes a selection pin that is configured to select the truth table from a plurality of truth tables.

In some aspects, the techniques described herein relate to a front-end module wherein each of the input circuit and the output circuit includes a plurality of switching pins to which the plurality of traces is connected, a first portion of the plurality of switching pins is positioned in series on a first side of the input circuit that is opposite to a second side of the input circuit that includes a second portion of the plurality of switching pins.

In some aspects, the techniques described herein relate to a front-end module wherein the plurality of traces is configured to connect each of the plurality of switching pins of the input circuit with a corresponding switching pin of the plurality of switching pins of the output circuit without traces of the plurality of traces overlapping.

In some aspects, the techniques described herein relate to a base station including: a transceiver configured to generate a radio frequency signal; a power amplifier configured to amplify the radio frequency signal to obtain an amplified radio frequency signal; an antenna; and a radio frequency switch configured to selectively electrically connect an output of the power amplifier to the antenna, the radio frequency switch including an input circuit configured to receive the amplified radio frequency signal and route the amplified radio frequency signal to a path determined based at least in part on a control signal received via a first control port of the input circuit, an output circuit configured to detect the amplified radio frequency signal transmitted through the path based at least in part on the control signal that is received via a second control port of the output circuit and output a tuned version of the amplified radio frequency signal, the second control port being electrically coupled to the first control port such that the control signal is applied to both the first control port and the second control port, and a plurality of traces configured to provide a plurality of paths configured to transmit radio frequency signals between the input circuit and the output circuit, the plurality of paths including the path determined based at least in part on the control signal.

In some aspects, the techniques described herein relate to a base station wherein each of the first control port and the second control port includes a plurality of control pins, and each control pin of the first control port is electrically coupled to a corresponding control pin of the second control port respectively without traces of the plurality of traces overlapping.

In some aspects, the techniques described herein relate to a base station wherein the control signal includes a plurality of binary values, each of which is applied to one of the plurality of control pins of the first control port and a corresponding control pin of the plurality of control pins of the second control port.

In some aspects, the techniques described herein relate to a base station wherein the path through which the radio frequency signal is transmitted from the input circuit to the output circuit is determined by a combination of the plurality of binary values specified in a truth table selected from a plurality of truth tables based at least in part on a control signal received at a selection pin of the first control port and a selection pin of the second control port.

DETAILED DESCRIPTION OF EMBODIMENTS

Figure 1:
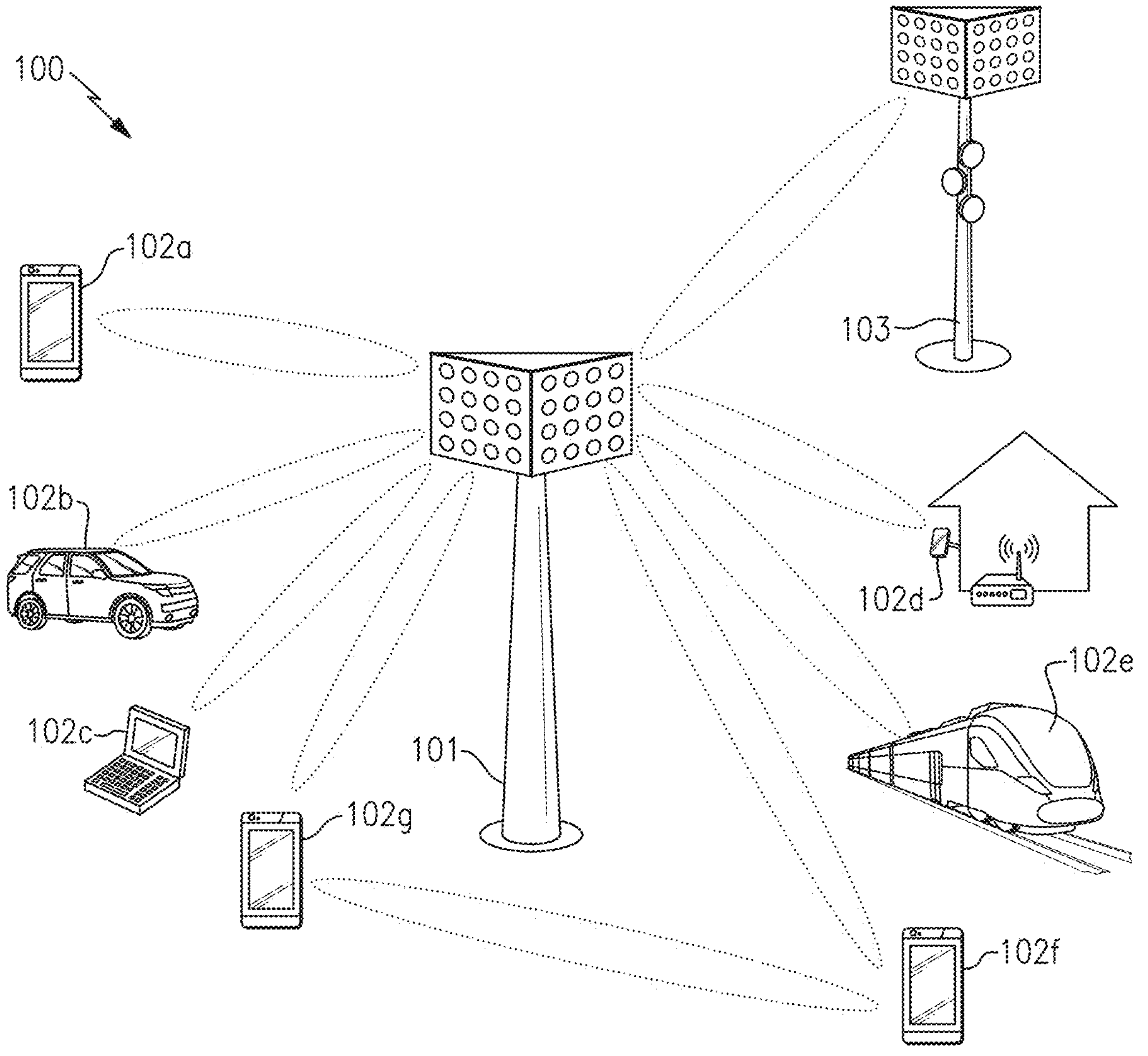
FIG. 1 is a schematic diagram of a communication network in accordance with certain embodiments.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1 is a schematic diagram of one example of a communication network 100. The communication network 100 includes a macro cell base station 101, a small cell base station 103, and various examples of user equipment (UE), including a first mobile device 102*a*, a wireless-connected car 102*b*, a laptop 102*c*, a stationary wireless device 102*d*, a wireless-connected train 102*e*, a second mobile device 102*f*, and a third mobile device 102*g*.

Although specific examples of base stations and user equipment are illustrated in FIG. 1, a communication network can include base stations and user equipment of a wide variety of types and/or numbers.

For instance, in the example shown, the communication network 100 includes the macro cell base station 101 and the small cell base station 103. The small cell base station 103 can operate with relatively lower power, shorter range, and/or with fewer concurrent users relative to the macro cell base station 101. The small cell base station 3 can also be referred to as a femtocell, a picocell, or a microcell. Although the communication network 100 is illustrated as including two base stations, the communication network 100 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 100 of FIG. 1 supports communications using a variety of cellular technologies, including, for example, 4G LTE, 5G, and 5G NR. In certain implementations, the communication network 10 is further adapted to provide a wireless local area network (WLAN), such as WiFi. Although various examples of communication technologies have been provided, the communication network 100 can be adapted to support a wide variety of communication technologies.

Various communication links of the communication network 100 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 100 can be implemented to support self-fronthaul and/or self-backhaul (for instance, as between mobile device 102*g* and mobile device 102*f*).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In some embodiments, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 100 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 3 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 100 of FIG. 1 can be used to support a wide variety of advanced communication features, including, but not limited to, eMBB, uRLLC, and/or mMTC.

Figure 2A:
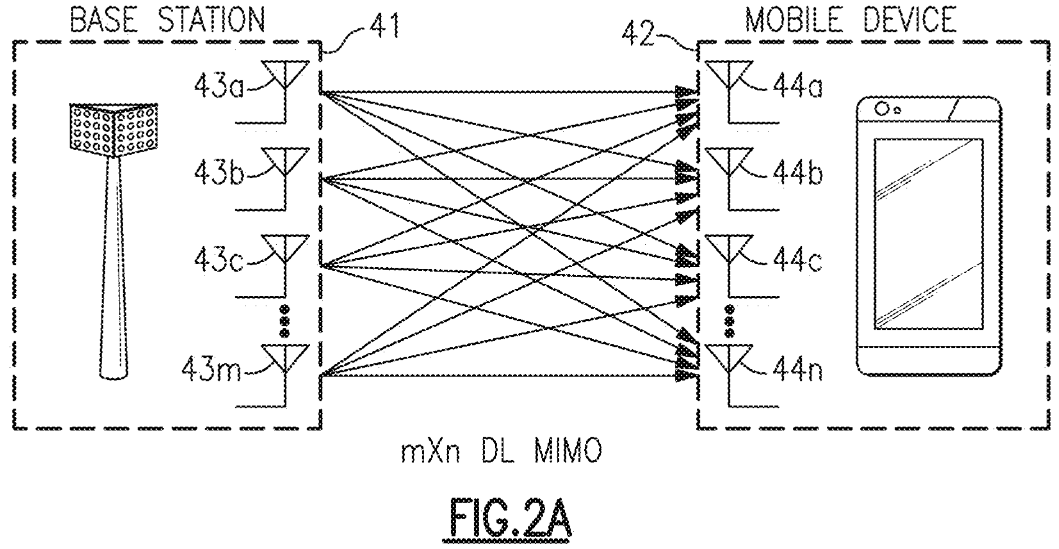
FIG. 2A is a schematic diagram of a downlink channel using multi-input and multi-output (MIMO) communications in accordance with certain embodiments.
Figure 2B:
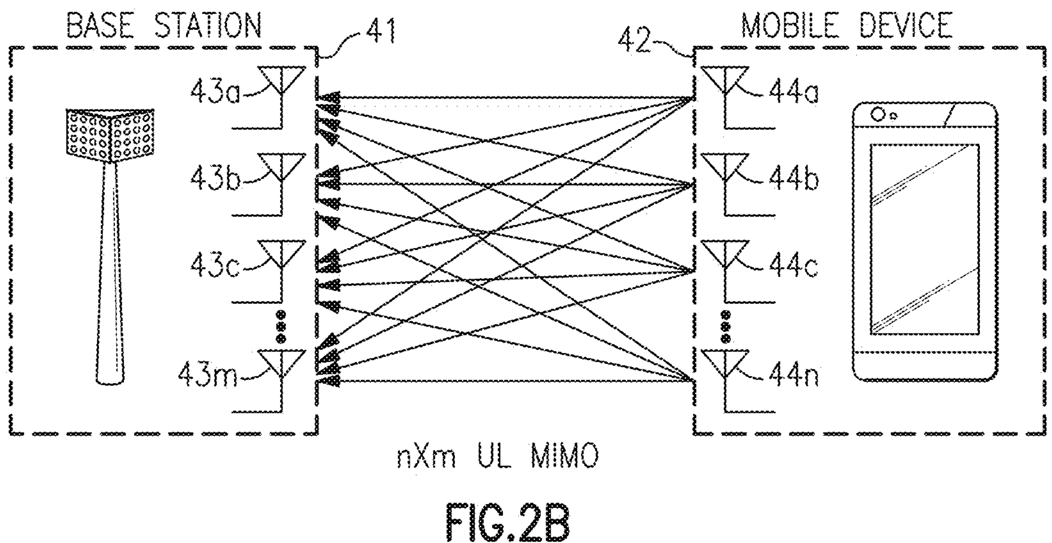
FIG. 2B is schematic diagram of an uplink channel using MIMO communications in accordance with certain embodiments.

FIG. 2A is a schematic diagram of one example of a downlink channel using multi-input and multi-output (MIMO) communications. FIG. 2B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 2A, downlink MIMO communications are provided by transmitting using M antennas 43*a*, 43*b*, 43*c*, . . . 43*m* of the base station 41 and receiving using N antennas 44*a*, 44*b*, 44*c*, . . . 44*n* of the mobile device 42. Accordingly, FIG. 2A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 2B, uplink MIMO communications are provided by transmitting using N antennas 44*a*, 44*b*, 44*c*, . . . 44 *n* of the mobile device 42 and receiving using M antennas 43*a*, 43*b*, 43*c*, . . . 43*m* of the base station 41. Accordingly, FIG. 2B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3:
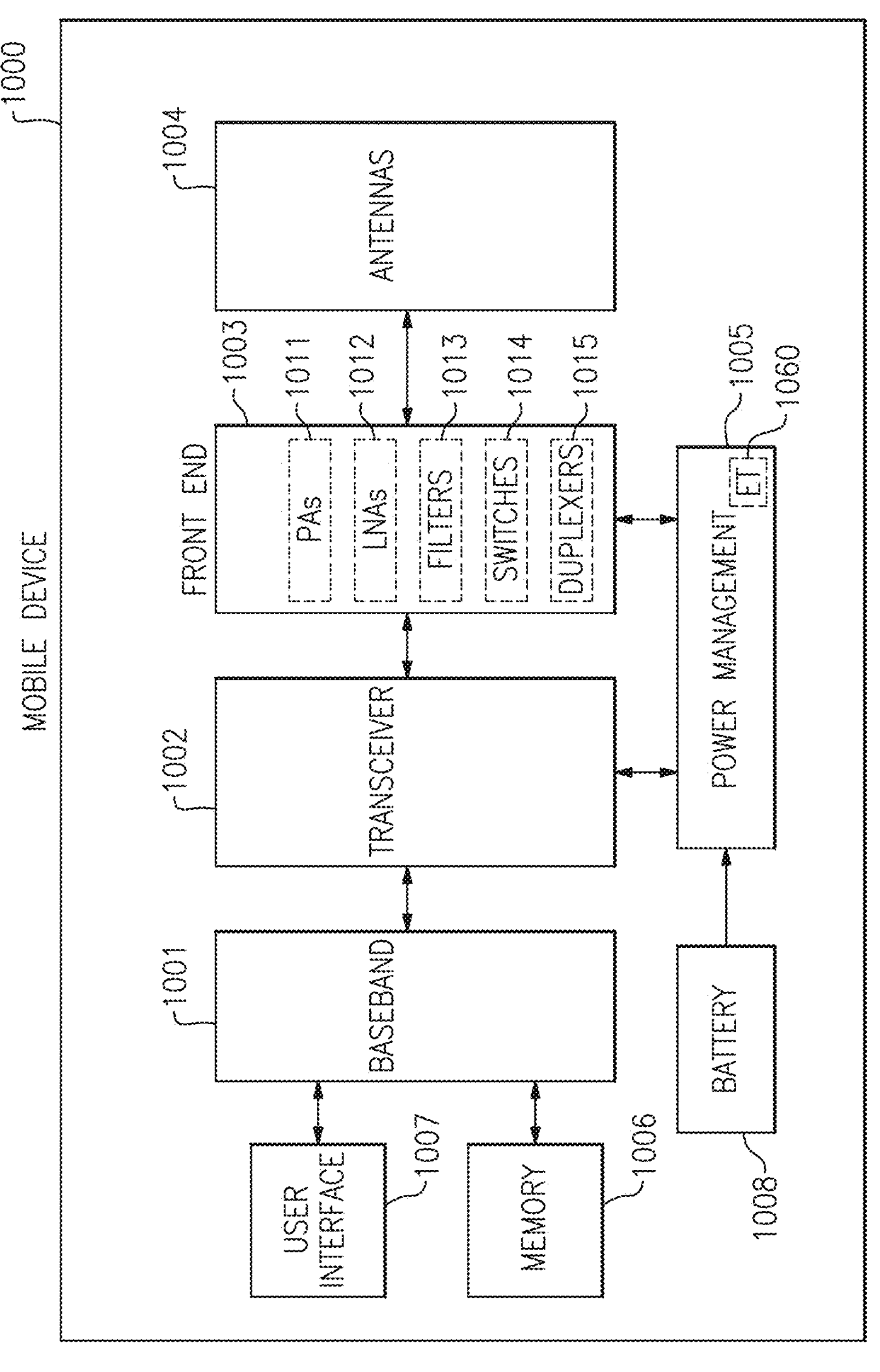
FIG. 3 is a schematic diagram of a mobile device in accordance with certain embodiments.

FIG. 3 is a schematic diagram of one example of a mobile device 1000. The mobile device 1000 includes a baseband system 1001, a transceiver 1002, a front end system 1003, antennas 1004, a power management system 1005, a memory 1006, a user interface 1007, and a battery 1008.

The mobile device 1000 can be used communicate using a wide variety of communications technologies, including, but not limited to, 2G, 3G, 4G (including LTE, LTE-Advanced, and LTE-Advanced Pro), 5G, WLAN (for instance, Wi-Fi), WPAN (for instance, Bluetooth and ZigBee), WMAN (for instance, WiMax), and/or GPS technologies.

The transceiver 1002 generates RF signals for transmission and processes incoming RF signals received from the antennas 1004. It will be understood that various functionalities associated with the transmission and receiving of RF signals can be achieved by one or more components that are collectively represented in FIG. 1 as the transceiver 1002. In one example, separate components (for instance, separate circuits or dies) can be provided for handling certain types of RF signals.

The front end system 1003 aids in conditioning signals transmitted to and/or received from the antennas 1004. In the illustrated embodiment, the front end system 1003 includes power amplifiers (PAs) 1011, low noise amplifiers (LNAs) 1012, filters 1013, switches 1014, and duplexers 1015. However, other implementations are possible.

For example, the front end system 1003 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 1000 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band and/or in different bands.

The antennas 1004 can include antennas used for a wide variety of types of communications. For example, the antennas 1004 can include antennas associated with transmitting and/or receiving signals associated with a wide variety of frequencies and communications standards.

In certain implementations, the antennas 1004 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 1000 can operate with beamforming in certain implementations. For example, the front end system 1003 can include phase shifters having variable phase controlled by the transceiver 1002. Additionally, the phase shifters are controlled to provide beam formation and directivity for transmission and/or reception of signals using the antennas 1004. For example, in the context of signal transmission, the phases of the transmit signals provided to the antennas 1004 are controlled such that radiated signals from the antennas 1004 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 1004 from a particular direction. In certain implementations, the antennas 1004 include one or more arrays of antenna elements to enhance beamforming.

The baseband system 1001 is coupled to the user interface 1007 to facilitate processing of various user input and output (110), such as voice and data. The baseband system 1001 provides the transceiver 1002 with digital representations of transmit signals, which the transceiver 1002 processes to generate RF signals for transmission. The baseband system 1001 also processes digital representations of received signals provided by the transceiver 1002. As shown in FIG. 3, the baseband system 1001 is coupled to the memory 1006 of facilitate operation of the mobile device 1000.

The memory 1006 can be used for a wide variety of purposes, such as storing data and/or instructions to facilitate the operation of the mobile device 1000 and/or to provide storage of user information.

The power management system 1005 provides a number of power management functions of the mobile device 1000. The power management system 1005 of FIG. 3 includes an envelope tracker 1060. As shown in FIG. 3, the power management system 1005 receives a battery voltage form the battery 1008. The battery 1008 can be any suitable battery for use in the mobile device 1000, including, for example, a lithium-ion battery.

The mobile device 1000 of FIG. 3 illustrates one example of an RF communication system that can include power amplifier(s) implemented in accordance with one or more features of the present disclosure. However, the teachings herein are applicable to RF communication systems implemented in a wide variety of ways.

Figure 4:
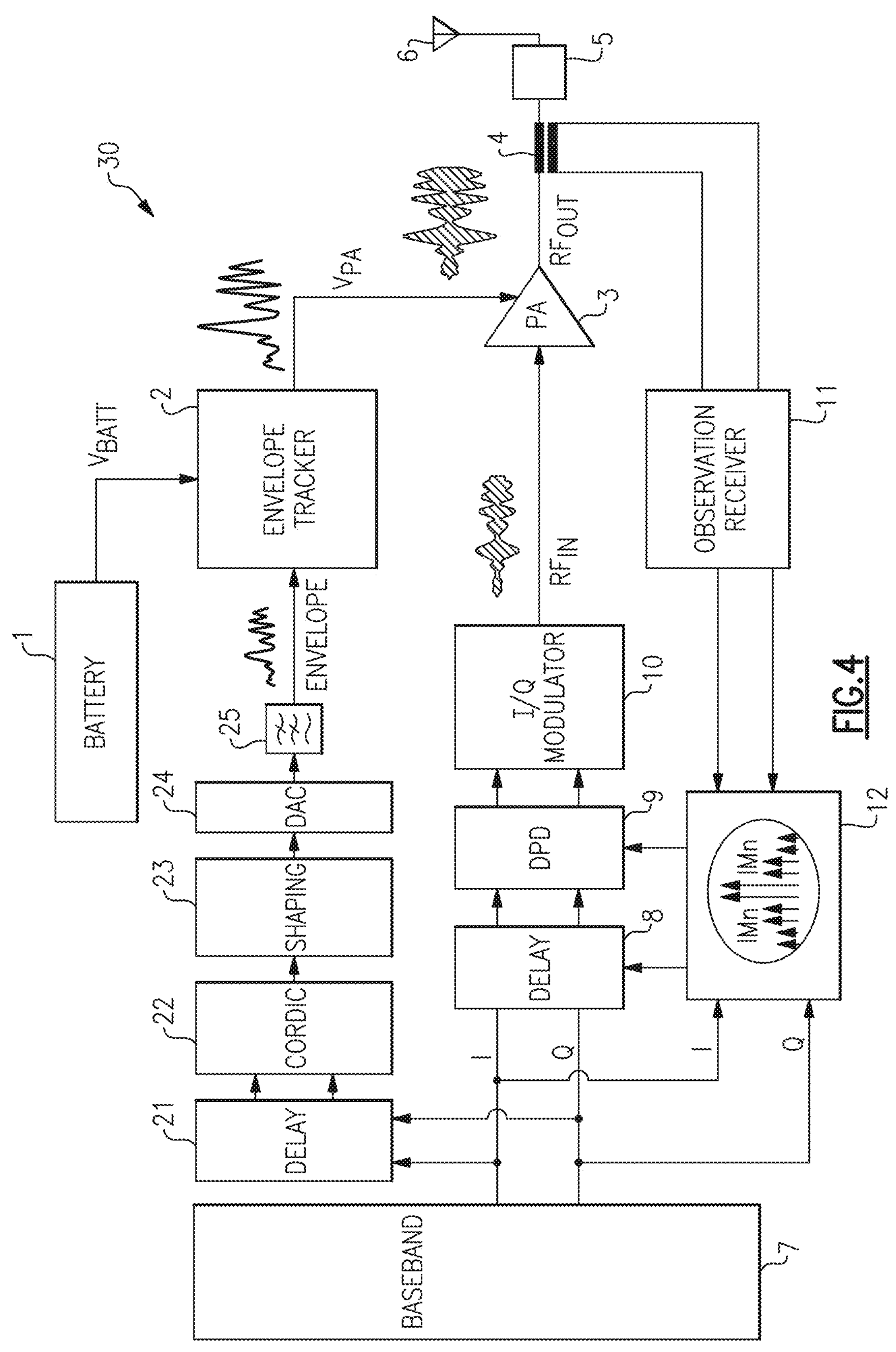
FIG. 4 is a schematic diagram of a transmit system for transmitting radio frequency (RF) signals from a mobile device in accordance with certain embodiments.

FIG. 4 is a schematic diagram of a transmit system 30 for transmitting RF signals from a mobile device, such as the mobile device 1000 depicted in FIG. 3, in accordance with certain embodiments. The transmit system 30 includes a battery 1, an envelope tracker 2, a power amplifier 3, a directional coupler 4, a duplexing and switching circuit 5, an antenna 6, a baseband processor 7, a signal delay circuit 8, a digital pre-distortion (DPD) circuit 9, an I/Q modulator 10, an observation receiver 11, an intermodulation detection circuit 12, an envelope delay circuit 21, a coordinate rotation digital computation (CORDIC) circuit 22, a shaping circuit 23, a digital-to-analog converter 24, and a reconstruction filter 25.

The transmit system 30 of FIG. 4 illustrates one example of an RF communication system that can include power amplifier(s) implemented in accordance with one or more features of the present disclosure. However, the teachings herein are applicable to RF communication systems implemented in a wide variety of ways.

The baseband processor 7 operates to generate an I signal and a Q signal, which correspond to signal components of a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals are provided to the I/Q modulator 10 in a digital format. The baseband processor 7 can be any suitable processor configured to process a baseband signal. For instance, the baseband processor 7 can include a digital signal processor, a microprocessor, a programmable core, or any combination thereof.

The signal delay circuit 8 provides adjustable delay to the I and Q signals to aid in controlling relative alignment between the envelope signal and the RF signal $RF_{IN}$. The amount of delay provided by the signal delay circuit 8 is controlled based on amount of intermodulation detected by the intermodulation detection circuit 12.

The DPD circuit 9 operates to provide digital shaping to the delayed I and Q signals from the signal delay circuit 8 to generate digitally pre-distorted I and Q signals. In the illustrated embodiment, the DPD provided by the DPD circuit 9 is controlled based on amount of intermodulation detected by the intermodulation detection circuit 12. The DPD circuit 9 serves to reduce a distortion of the power amplifier 3 and/or to increase the efficiency of the power amplifier 3.

The I/Q modulator 10 receives the digitally pre-distorted I and Q signals, which are processed to generate an RF signal $RF_{IN}$. For example, the I/Q modulator 10 can include DACs configured to convert the digitally pre-distorted I and Q signals into an analog format, mixers for upconverting the analog I and Q signals to radio frequency, and a signal combiner for combining the upconverted I and Q signals into an RF signal suitable for amplification by the power amplifier 3. In certain implementations, the I/Q modulator 10 can include one or more filters configured to filter frequency content of signals processed therein.

The envelope delay circuit 21 delays the I and Q signals from the baseband processor 7. Additionally, the CORDIC circuit 22 processes the delayed I and Q signals to generate a digital envelope signal representing an envelope of the RF signal $RF_{IN}$. Although FIG. 4 illustrates an implementation using the CORDIC circuit 22, an envelope signal can be obtained in other ways.

The shaping circuit 23 operates to shape the digital envelope signal to enhance the performance of the transmit system 30. In certain implementations, the shaping circuit 23 includes a shaping table that maps each level of the digital envelope signal to a corresponding shaped envelope signal level. Envelope shaping can aid in controlling linearity, distortion, and/or efficiency of the power amplifier 3.

In the illustrated embodiment, the shaped envelope signal is a digital signal that is converted by the DAC 24 to an analog envelope signal. Additionally, the analog envelope signal is filtered by the reconstruction filter 25 to generate an envelope signal suitable for use by the envelope tracker 2. In certain implementations, the reconstruction filter 25 includes a low pass filter.

With continuing reference to FIG. 4, the envelope tracker 2 receives the envelope signal from the reconstruction filter 25 and a battery voltage $V_{BATT}$ from the battery 1, and uses the envelope signal to generate a power amplifier supply voltage $V_{PA}$ for the power amplifier 3 that changes in relation to the envelope of the RF signal $RF_{IN}$. The power amplifier 3 receives the RF signal $RF_{IN}$ from the I/Q modulator 10, and provides an amplified RF signal $RF_{OUT}$ to the antenna 6 through the duplexing and switching circuit 5, in this example.

The directional coupler 4 is positioned between the output of the power amplifier 3 and the input of the duplexing and switching circuit 5, thereby allowing a measurement of output power of the power amplifier 3 that does not include insertion loss of the duplexing and switching circuit 5. The sensed output signal from the directional coupler 4 is provided to the observation receiver 11, which can include mixers for down converting I and Q signal components of the sensed output signal, and DACs for generating I and Q observation signals from the downconverted signals.

The intermodulation detection circuit 12 determines an intermodulation product between the I and Q observation signals and the I and Q signals from the baseband processor 7. Additionally, the intermodulation detection circuit 12 controls the DPD provided by the DPD circuit 9 and/or a delay of the signal delay circuit 8 to control relative alignment between the envelope signal and the RF signal $RF_{IN}$.

By including a feedback path from the output of the power amplifier 3 and baseband, the I and Q signals can be dynamically adjusted to optimize the operation of the transmit system 30. For example, configuring the transmit system 30 in this manner can aid in providing power control, compensating for transmitter impairments, and/or in performing DPD.

Although illustrated as a single stage, the power amplifier 3 can include one or more stages. Furthermore, RF communication systems such as mobile devices can include multiple power amplifiers. In such implementations, separate envelope trackers can be provided for different power amplifiers and/or one or more shared envelope trackers can be used.

Figure 5:
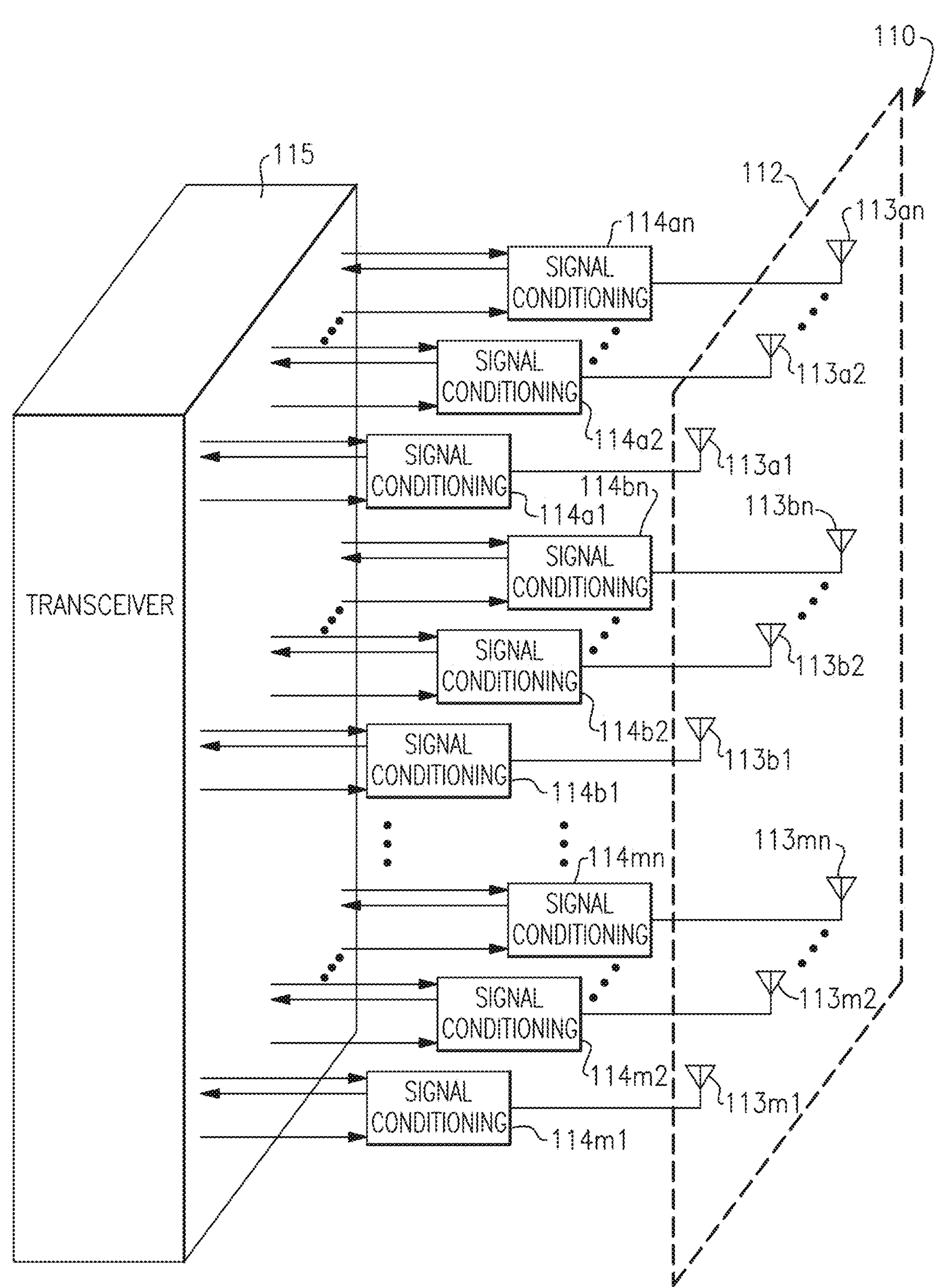
FIG. 5 is a schematic diagram of a communication system that operates with beamforming in accordance with certain embodiments.

FIG. 5 is a schematic diagram of one example of a communication system 110 that operates with beamforming. The communication system 110 includes a transceiver 115, signal conditioning circuits **114*a*1, 114*a*2, . . . 114*an*, 114*b*1, 114*b*2, . . . 114*bn*, 114*m*1, 114*m*, . . . 114*mn*, and an antenna array 112 that includes antenna elements 113*a*1, 113*a*2, . . . 113*an*, 113*b*1, 131*b*2, . . . 113*bn*, 113*m*1, 113*m*2 . . . 103*mn*. In some embodiments, at least a portion of the antenna elements 113*a*1, 113*a*2, . . . 113*an*, 113*b*1, 113*b*2, . . . 113*bn*, 113*m*1, 113*m*2, . . . 113*mn*** are loaded by one or more tuning conductors to provide antenna configurability in accordance with the teachings herein.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 112 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 112 such that signals radiated from the antenna elements combine using constructive and destructive interference to generate an aggregate transmit signal exhibiting beam-like qualities with more signal strength propagating in a given direction away from the antenna array 112.

In the context of signal reception, the signal conditioning circuits process the received signals (for instance, by separately controlling received signal phases) such that more signal energy is received when the signal is arriving at the antenna array 112 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 115 provides transmit signals to the signal conditioning circuits and processes signals received from the signal conditioning circuits. As shown in FIG. 5, the transceiver 115 generates control signals for the signal conditioning circuits. The control signals can be used for a variety of functions, such as controlling the phase of transmitted or received signals to control beam forming.

Figure 6:
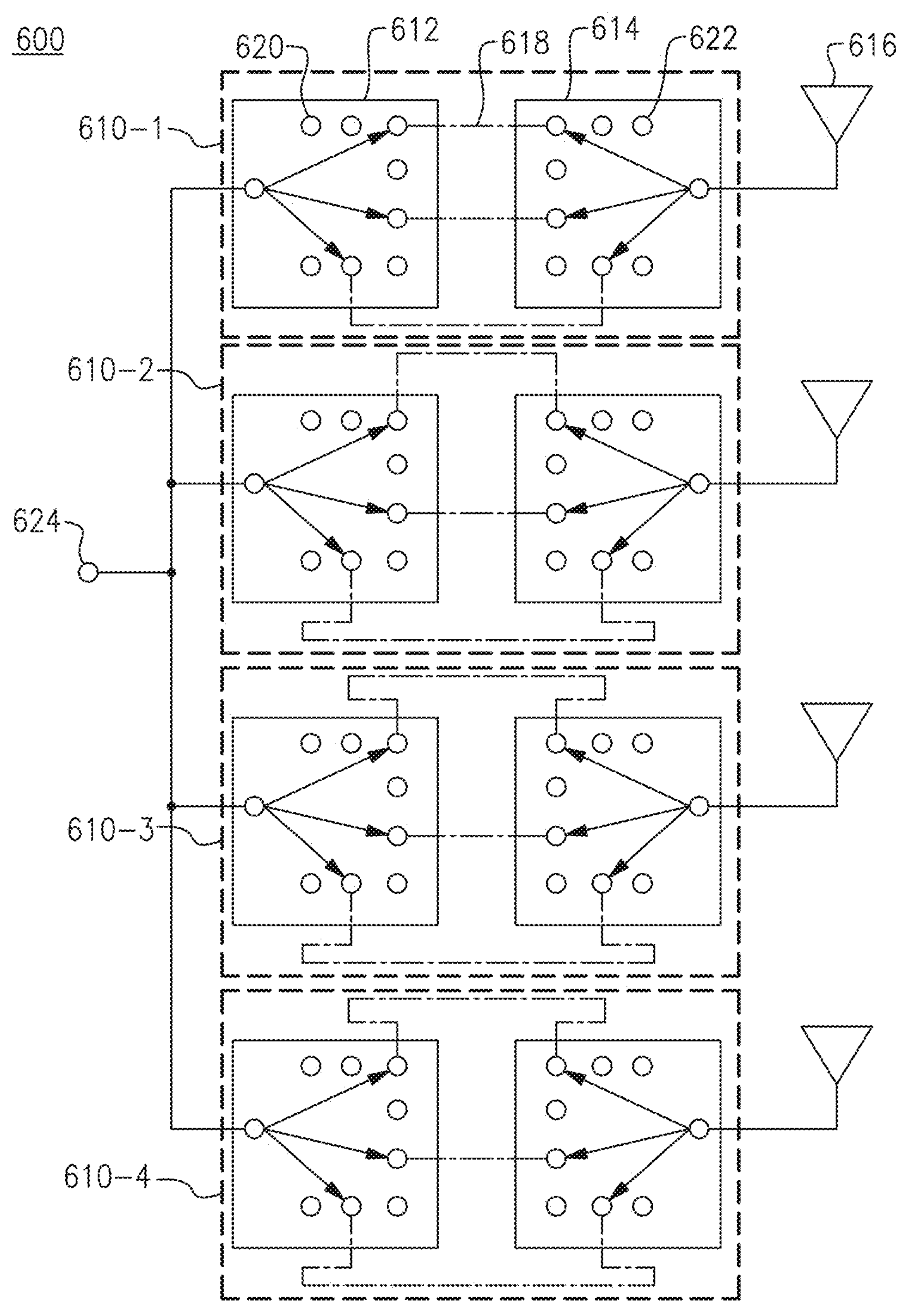
FIG. 6 is a schematic diagram of RF or mmW beamforming circuits using delay lines and switches in accordance with certain embodiments.

FIG. 6 is a schematic diagram of an example of an RF or mmW beamforming circuit 600 using delay lines and switches. The beamforming circuit 600 according to certain embodiments can be a part of a front-end module, and can include an RF switching circuit 610.

FIG. 6 illustrates four layers or four instances of RF switching circuits 610-1, 610-2, 610-3, 610-4. It should be understood that the beamforming circuit 600 may include more or fewer instances of the RF switching circuits. To simplify discussion, only one instance of the RF switching circuit 610-1 is described below. However, embodiments described with respect to the RF switching circuit 610-1 may also apply to one or more of the RF switching circuits 610-2, 610-3, 610-4. The RF switching circuit 610-1 can be built as a phase shifter for beam forming signals of an antenna array for mmW and 5G networks using 2 back-to-back SPnT switches.

The RF switching circuit 610-1 shown in FIG. 6 includes an input circuit 612, and an output circuit 614. The input circuit 612 is configured to receive an amplified RF signal from a power amplifier. The output circuit 614 is configured to provide a tuned version of the RF signal to antenna 616. The RF signal can be tuned while passing a delay line 618 connected between the input circuit 612 and the output circuit 614. The delay line 618 can be replaced by any network providing the requiring signal conditioning, such as a passive filter network made of inductor and capacitors, or an active filter network.

Depending on the desired amount of delay, the most appropriate delay line to achieve the desired delay may be selected. Once the delay line is selected, the input circuit 612 and the output circuit 614 may control pins 620, 622 to activate the path on the delay line.

According to an example shown in FIG. 6, each of the input circuit 612 and the output circuit 614 needs a separate control signal to control the control pins 620, 622 respectively. Further, as illustrated in FIG. 6, each of the input circuit 612 and the output circuit 614 may include a single pole multiple throw (SPnT) switch. In some cases, reuse of the same part of the SPnT switch to implement the control pins 620, 622 may lead to either crossing of the RF traces and control traces, which may cause poor RF isolation and require one or more extra PCB layers for routing, or may need separate control buses for the input and output of the SPnT of the input circuit 612 and the SPnT of the output circuit 614 to correctly match the ports of the two switches on the same delay trace or delay line 618.

Therefore, it is desirable to develop a single part or a single circuit to be used for both input and output with no crossing of the RF and control lines, enabling RF traces on top layer and a single control and supply bus to be used by both input circuit and output circuit. Using a single part for both the input circuit 612 and the output circuit 614 can simplify manufacturing as well as layout, among other advantages.

Figure 7:
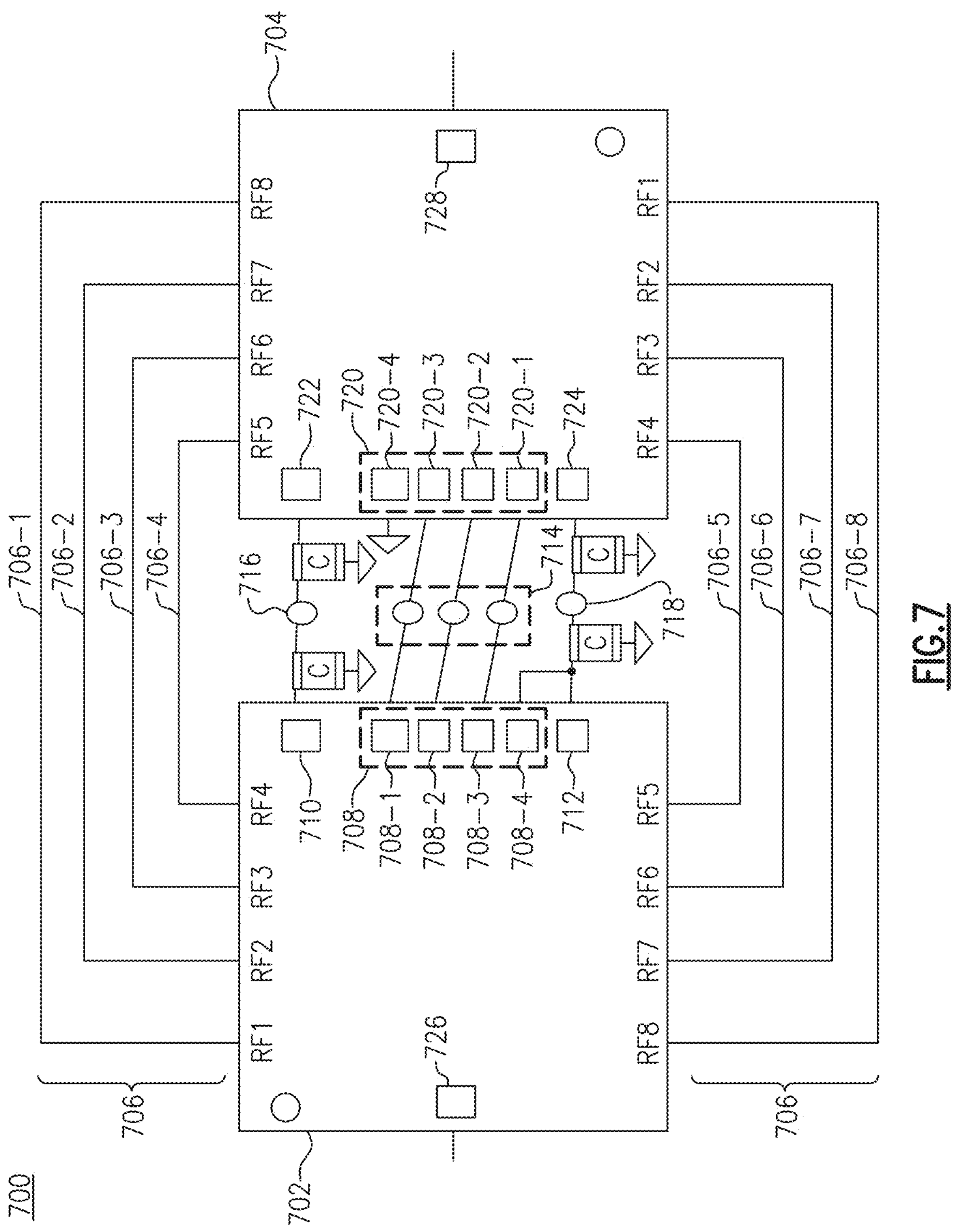
FIG. 7 is a schematic diagram of a beamformer using switched delay lines and the same switch product or pinout for the input and output switches in accordance with certain embodiments.

FIG. 7 is a schematic diagram of certain embodiments of a portion of a beamforming circuit that includes a RF switch module 700 that includes switched delay lines and the use of two identical switch modules that may be used for an input circuit 702 and an output circuit 704 of the beamformer. FIG. 7 further illustrates a pinout for the portion of the beamforming circuit that includes the switch module 700.

According to an embodiment, the RF switch module 700 includes an input circuit 702, an output circuit 704 and a plurality of traces 706. According to an embodiment, the input circuit 702 or the output circuit 704 can be implemented as a stand-alone circuit, which is also referred to as a RF switching circuit.

The input circuit 702 and the output circuit 704 may be an identical circuit. The terms 'input' and 'output' are used to distinguish from each other for the purpose of clarity. The input circuit 702 can be used as an output circuit and similarly, the output circuit 704 can be used as an input circuit. For example, during transmission the input circuit 702 may function as an input circuit and the output circuit 704 may function as an output circuit, but when receiving a signal, the input circuit 702 may function as an output circuit and the output circuit 704 may function as an input circuit. The input circuit 702 and the output circuit 704 may be programmable circuits which are configured to operate according to pre-defined logic. Each of the input circuit 702 and the output circuit 704 may include a controller to execute procedures described below.

The input circuit 702 is configured to receive RF signals. The input circuit 702 includes an input port 726. The input port 726 of the input circuit 702 is positioned on a first edge of the input circuit 702. The input circuit 702 receives an RF signal via the input port 726. The input circuit is configured to route the RF signal to a path which is determined based on a control signal. For example, the input circuit 702 routes the RF signal to one of switch pins RF1-RF8, to which the plurality of traces is connected, according to the received control signal. In FIG. 7, it is illustrated that the input circuit 702 includes 8 switch pins, but the number of the switch pins is not limited thereto. Each of the switch pins RF1-RF8 is connected to a corresponding trace to transmit the RF signal to the output circuit 704. The path through which the RF signal is routed is one of the traces connecting the input circuit 702 and the output circuit 704.

The input circuit 702 receives the control signal via a first control port 708 positioned on the input circuit 702. The first control port 708 may be positioned on a second edge of the input circuit 702 that is opposite to the first edge. However, the location of the first control port 708 is not limited thereto. For example, the first control port 708 can be located through at least two edges. The control port 708 includes a plurality of control pins. For example, the first control port 708 includes 3 control pins 708-1, 708-2, 708-3 to receive the control signal. In FIG. 7, it is illustrated that the first control port 708 includes 3 control pins to receive the control signal, but the number of the control pins is not limited thereto and may include more or fewer control pins. The control signal may be received from a controller 714 which generates the control signal.

The control signal may include a plurality of binary values, 0 or 1. Each of the binary values is applied to one of the control pins 708-1, 708-2, 708-3 of the first control port 708. In certain embodiments, the number of binary value included in the control signal may correspond to the number of control pins 708-1, 708-2, 708-3 of the first control port 708. For example, for a control signal implemented as a 3-digit binary value, at least 3 control pins may be required. More generally, the number of control pins may be equal to or greater than the digits of the binary values. Therefore, it is to be understood that the number of RF paths is not always necessarily a 1:1 match to possible logic combination. According to certain embodiments, the input circuit 702 is configured to route the RF signal based on combination of binary value applied to each of the control pins 708-1, 708-2,

708-3. Therefore, the number of the control pins 708-1, 708-2, 708-3 of the first control port 708 may be determined by the number of switch pins RF1-RF8 of the input circuit 702. For example, the 8 switch pins RF1-RF8 can be respectively represented by 3-digit binary value. Therefore, the control signal according to certain embodiments can be a 3-digit binary value for controlling 8 switching pins. The switching pin placement is made to provide RF symmetry with a shared control plane in order to use a mirrored layout. The placement of switching pins will be described in detail below.

Figure 9:
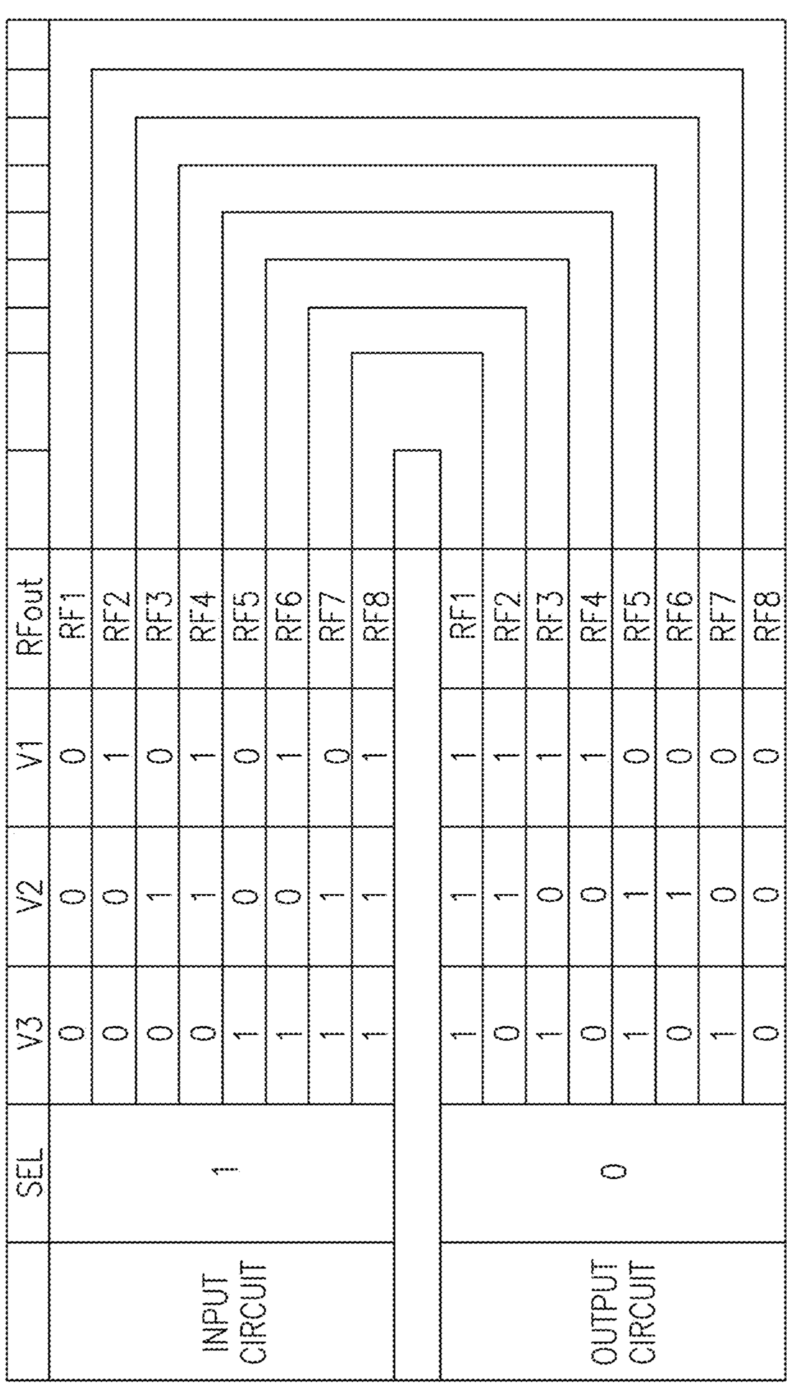
FIG. 9 is an example for a truth table used for the RF switch module of FIG. 7 in accordance with certain embodiments.

The input circuit 702 can operate based on at least one truth table. For example, the combination of control signal values may indicate one of the switch pins, and the input circuit 702 routes the RF signal to the indicated switch pins. An example of the truth table is shown in FIG. 9. The first control port 708 may further include a selection pin 708-4 configured to select a specific truth table. The signal input to the selection pin 708-4 may be a one-digit binary value. The selection pin 708-4 enables selection of a truth table configuration. In other words, the selection pin 708-4 may rearrange the truth table mapping of the control pins to the enabled switching pins. The mapping can be done either by multiplexing the control pin, or by changing the decoder/truth table or by any combination of remapping control pins and switching pins.

The input circuit 702 may further include at least one power supply pins 710, 712 to receive power supply, for example Vcc or Vdd, respectively, in cases where the power or bias does not come directly from the control pins. Each of the power supply pins 710, 712 is provided with the power from power supply nodes 716, 718 via a grounded capacitor. The selection pin 708-4 of the input circuit 702 can be connected to the power supply pin 712. Vdd and Vdd* (Vcc and Vcc*) are connected inside the package to facilitate PCB routing. It is understood that each supply (Vdd and Vcc in this non-limiting case) is provided on two pins (internally connected in the package) to provide simpler routing on the customer PCB (crossing realized inside the package) for further simplification of the customer PCB compared to systems that use heterogenous switching systems.

The output circuit 704 is configured to provide a tuned version of the RF signal. According to certain embodiments, the tuned version of RF signal may be a phase shifted RF signal.

As shown in FIG. 7, the output circuit 704 is arranged in a form of being rotated 180 degrees from the input circuit 702. In other words, in some implementations, the output circuit 704 may be an identical circuit to the input circuit 702 and may be arranged in a rotated manner from the input circuit 702 to align the control pins 708 and the control pins 720 with each other and the controller 714. The circles marked in each of the input circuit 702 and the output circuit 704 indicate a same spot in each of the input circuit 702 and the output circuit 704. The switch pins RF1-8 on the input circuit 702 are also rotated 180 degrees in the output circuit 704.

The output circuit 704 is configured to detect the RF signal transmitted through the path determined based on the control signal. The output circuit 704 receives the control signal via a second control port 720 positioned on the output circuit 704. The second control port 720 includes a plurality of control pins. For example, the second control port 720 includes 3 control pins 720-1, 720-2, 720-3 to receive the control signal. In FIG. 7, it is illustrated that the second control port 720 includes 3 control pins to receive the control signal, but the number of the control pins is not limited thereto. The control signal is received from a controller 714 which generates the control signal.

The second control port 720 is coupled to the first control port 708. For example, each of the control pins 720-1, 720-2, 720-3 of the second control port 720 is respectively coupled to one of the control pins 708-1, 708-2, 708-3 of the first control port 708. More specifically, the control pin 720-1 of the second control port 720 is coupled to the control pin 708-3 of the first control port 708. The control pin 720-2 of the second control port 720 is coupled to the control pin 708-2 of the first control port 708. The control pin 720-3 of the second control port 720 is coupled to the control pin 708-1 of the first control port 708. Therefore, the control signal input to the first control port 708 of the input circuit 702 is also applied to the output circuit 704 through the second control port 720. In other words, the control signal is common to both the input circuit 702 and the output circuit 704. According to an example, the second control port and the first control port are coupled without crossing of coupling lines. That is, the coupling line between each of control pins does not cross each other, simplifying routing and therefore reducing cost, increasing RF performance by reducing parasitic coupling.

The output circuit 704 is configured to detect the RF signal from the path indicated by the control signal. According to certain embodiments, the output circuit 704 operates based on at least one truth table. For example, the combination of control signal indicates one of the switch pins, and the output circuit 704 contacts one of the switch pins RF1-8 to connect with a path through which the RF signal is transmitted. An example of the truth table is shown in FIG. 9. The second control port 720 may further include a selection pin 720-4 configured to select a specific truth table. As shown in FIG. 7, the selection pin 720-4 according to certain embodiments can be connected to a ground.

The output circuit 704 outputs the tuned version of the RF signal. The output circuit 704 is configured to output the tuned RF signal via an output node 728. According to certain embodiments, the tuned RF signal is a phase shifted RF signal.

The output circuit 720 further includes at least one power supply pins 722, 724 to receive power supply, for example, Vcc or Vdd. Each of the power supply pins 722, 724 is provided with the power from power supply nodes 716, 718 via a grounded capacitor.

The plurality of traces 706 is configured provide each path through which the RF signal is transmitted from the input circuit 702 to the output circuit 704. The trace can be also referred to as a delay line. Each of the plurality of traces is connected between one of switching pins RF1-8 of the input circuit 702 and a corresponding switching pin RF1-8 of the output circuit 704. According to certain embodiments, the plurality of traces are configured such that none of the traces overlap or cross each other and therefore the RF isolation can be improved compared, for example, to embodiments that may include overlapping traces at one or multiple layers.

A first half of the switching pins may be positioned on an opposite side of the input circuit 702 (or output circuit 704) to a second half of the switching pins. That is, the switching pins RF1-8 of the input circuit 702 (or output circuit 704) are divided into two groups, and one group is positioned on one side of the input circuit 702 and the other group is positioned on the opposite side of the input circuit. As shown in FIG. 7, switching pins RF1-4 are positioned on an upper or first side of the input circuit 702, and switching pins RF5-8 are positioned on a lower or second side of the input circuit 702 that is opposite to the first side. However, the location of switching pins is not limited thereto. For example, it is also possible that the switching pins are located on upper and same side as the input port 726. In addition, the plurality of traces is configured to connect each of the switching pins of the input circuit with a corresponding switching pin in order of proximity or close distance to each other so as to avoid crossing of the plurality of traces. For example, the trace 706-1 is connected between RF1 of the input circuit 702 and RF8 of the output circuit 704. The trace 706-2 is connected between RF2 of the input circuit 702 and RF7 of the output circuit 704. The trace 706-3 is connected between RF3 of the input circuit 702 and RF6 of the output circuit 704. The trace 706-4 is connected between RF4 of the input circuit 702 and RF5 of the output circuit 704. The trace 706-5 is connected between RF5 of the input circuit 702 and RF4 of the output circuit 704. The trace 706-6 is connected between RF6 of the input circuit 702 and RF3 of the output circuit 704. The trace 706-7 is connected between RF7 of the input circuit 702 and RF2 of the output circuit 704. The trace 706-8 is connected between RF8 of the input circuit 702 and RF1 of the output circuit 704. At least some of the traces 706 may have a different length of delay line, such to achieve different phases.

Each of the plurality of traces may be configured to shift a phase of the RF signal depending on each length of the plurality of traces 706 or a different delay circuit or discrete phase shifter such as the ones using active or passive components providing control over the electrical impedance. The tuned version of RF signal is phase shifted while passing or being transmitted along the traces 706.

By coupling the first control port 708 and the second control port 720, both the input circuit 702 and the output circuit 704 can be controlled by one control signal, what may be a 3-digit binary value. Therefore, the layout of the RF switch can be simplified, and the data used for controlling the RF switching module 700 can be significantly reduced.

Figure 8:
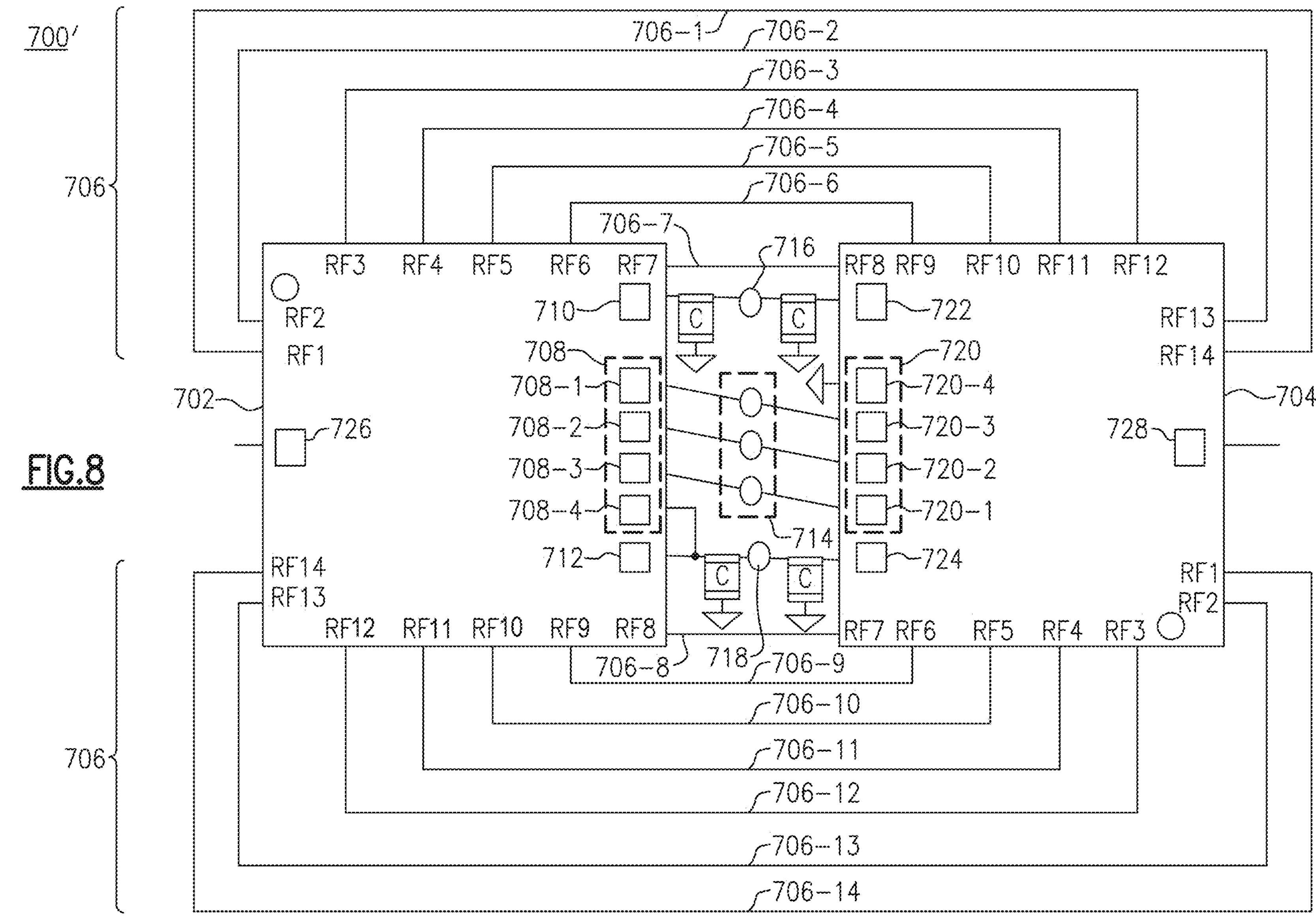
FIG. 8 is a schematic diagram of a beamformer using switched delay lines and the same switch product or pinout for the input and output switches in accordance with certain embodiments.

FIG. 8 is a schematic diagram of a portion of a beamforming circuit that includes switched delay lines and a switch module 700' in accordance with certain embodiments. The switch module 700' may be a modified version of the RF switch module 700. The switch module 700' shown in FIG. 8 has switching pins RF 1-14 and 14 RF traces. More specifically, the switching pins RF 1, 2, 13 and 14 are located on a same side as the input port, switching pins 7, 8 are located on a same side as the control port 708, and the switching pins RF 36 and 9-12 are located on upper and lower sides of the input circuit 702. More generally, the switching pins can be located on multiple sides, and the location of the switching pins is not limited to a specific structure. Further, the use of the terms upper, lower, top, bottom, etc. are for convenience and are not intended to be limiting. Thus, the upper side may instead be the lower side, etc.

Apart from the number and location of the switching pins of the input and output circuits 702, 704, other components of the switch module 700' may be similar or identical to the switch module 700 illustrated in FIG. 7.

As described above, FIG. 9 may depict a non-limiting example of a truth table used for the RF switch module 700 according to certain embodiments. The truth table may specify a set of binary values for each path between the input circuit 702 and the output circuit 704. In FIG. 9, the reference sign 'SEL' indicates a selection pins 708-4, 720-4. The reference signs V1, V2, V3 of FIG. 9 indicate control pins 708-1, 708-2, 708-3 of the first control port 708 in the input circuit 702, respectively. The reference signs V1, V2, V3 of FIG. 9 also indicate control pins 720-1, 720-2, 720-3 of the second control port 720 in the output circuit 704, respectively. Each of RF traces may have different length such that each RF trace generates different delay phase.

As shown in FIG. 9, the truth table can be defined in terms of the values of the control signal. The control signal includes a plurality of binary values. For example, the control signal is a 3-digit binary values. According to certain embodiments, the path through which the RF signal is transmitted from the input circuit to the output circuit is determined by a combination of the plurality of binary values referring to at least one truth table.

The example depicted in FIG. 9 shows the truth table in case the value '1' is input to the selection pin 708-4 of the first control port 708 and the value '0' is input to the selection pin 720-4 of the second control port 720. In this case, the truth table appears to be a symmetrical mirrored mode.

For example, when the control signal includes values of 0, 0, 0 for V3, V2, V1, respectively, the input circuit 702 and the output circuit 704 determine a path to be a trace connecting between switching pin RF1 of the input circuit 702 and switching pin RF8 of the output circuit 704. When the control signal includes values of 0, 0, 1 for V3, V2, V1, respectively, the input circuit 702 and the output circuit 704 determine a path to be a trace connecting between switching pin RF2 of the input circuit 702 and switching pin RF7 of the output circuit 704. When the control signal includes values of 0, 1, 0 for V3, V2, V1, respectively, the input circuit 702 and the output circuit 704 determine a path to be a trace connecting between switching pin RF3 of the input circuit 702 and switching pin RF6 of the output circuit 704. When the control signal includes values of 0, 1, 1 for V3, V2, V1, respectively, the input circuit 702 and the output circuit 704 determine a path to be a trace connecting between switching pin RF4 of the input circuit 702 and switching pin RF5 of the output circuit 704. When the control signal includes values of 1, 0, 0 for V3, V2, V1, respectively, the input circuit 702 and the output circuit 704 determine a path to be a trace connecting between switching pin RF5 of the input circuit 702 and switching pin RF4 of the output circuit 704. When the control signal includes values of 1, 0, 1 for V3, V2, V1, respectively, the input circuit 702 and the output circuit 704 determine a path to be a trace connecting between switching pin RF6 of the input circuit 702 and switching pin RF3 of the output circuit 704. When the control signal includes values of 1, 1, 0 for V3, V2, V1, respectively, the input circuit 702 and the output circuit 704 determine a path to be a trace connecting between switching pin RF7 of the input circuit 702 and switching pin RF7 of the output circuit 704. When the control signal includes values of 1, 1, 1 for V3, V2, V1, respectively, the input circuit 702 and the output circuit 704 determine a path to be a trace connecting between switching pin RF8 of the input circuit 702 and switching pin RF1 of the output circuit 704.

The values input to the selection pins 708-4, 720-4 can be controlled by a user of the device, and/or be predefined by the configuration. According to an embodiment, in case the value '0' is input to the selection pin 708-4 of the first control port 708, the input circuit 702 may operate as standard mode which is different from the symmetric mode.

Figure 10A:
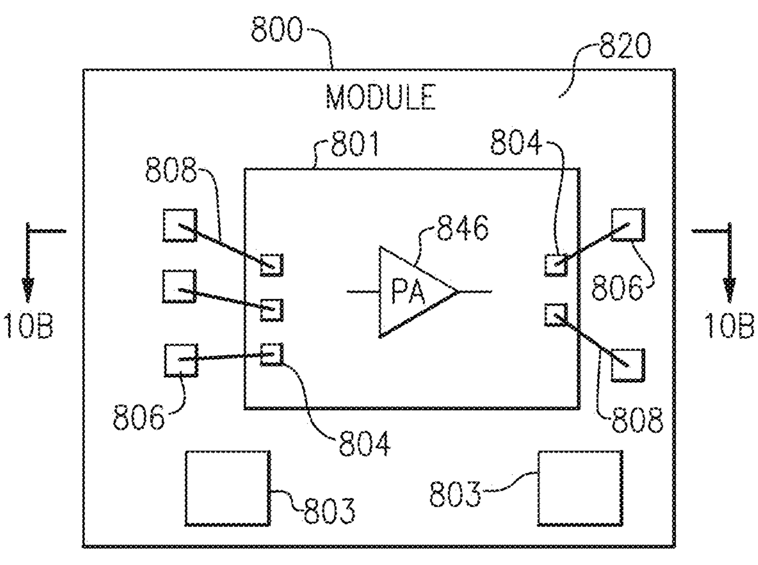
FIG. 10A is a schematic diagram of a packaged module in accordance with certain embodiments.
Figure 10B:
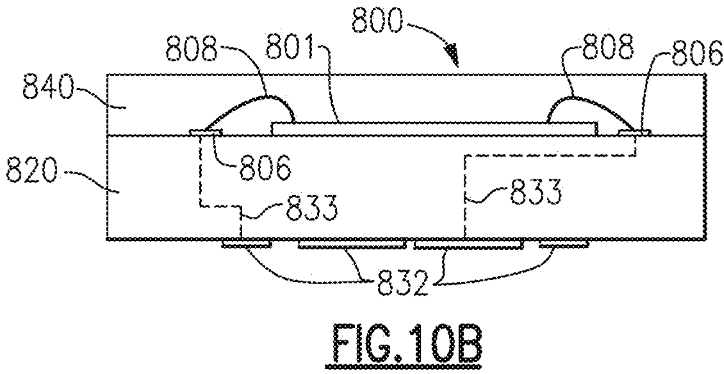
FIG. 10B is a schematic diagram of a cross-section of the packaged module of FIG. 10A taken along the lines 10A-10A in accordance with certain embodiments.

FIG. 10A is a schematic diagram of a packaged module 800 in accordance with certain embodiments. FIG. 10B is a schematic diagram of a cross-section of the packaged module 800 of FIG. 10A taken along the lines 10B-10B.

The packaged module 800 includes an IC or die 801, surface mount components 803, wirebonds 808, a package substrate 820, and encapsulation structure 840. The package substrate 820 includes pads 806 formed from conductors disposed therein. Additionally, the die 801 includes pads 804, and the wirebonds 808 have been used to electrically connect the pads 804 of the die 801 to the pads 806 of the package substrate 801.

The die 801 includes a power amplifier 846, which can be implemented in accordance with any of the embodiments herein. The output of the power amplifier 846 may serve as an input to the RF switch module 700. For example, the power amplifier 846 may amplify a signal for transmission, which may be supplied to the input port 726 of the input circuit 702 of a beamforming circuit.

The packaging substrate 820 can be configured to receive a plurality of components such as the die 801 and the surface mount components 803, which can include, for example, surface mount capacitors and/or inductors.

As shown in FIG. 10B, the packaged module 800 is shown to include a plurality of contact pads 832 disposed on the side of the packaged module 800 opposite the side used to mount the die 801. Configuring the packaged module 800 in this manner can aid in connecting the packaged module 800 to a circuit board such as a phone board of a wireless device. The example contact pads 832 can be configured to provide RF signals, bias signals, power low voltage(s) and/or power high voltage(s) to the die 801 and/or the surface mount components 803. As shown in FIG. 10B, the electrical connections between the contact pads 832 and the die 801 can be facilitated by connections 833 through the package substrate 820. The connections 833 can represent electrical paths formed through the package substrate 820, such as connections associated with vias and conductors of a multilayer laminated package substrate.

In some embodiments, the packaged module 800 can also include one or more packaging structures to, for example, provide protection and/or facilitate handling of the packaged module 800. Such a packaging structure can include overmold or encapsulation structure 840 formed over the packaging substrate 820 and the components and die(s) disposed thereon.

It will be understood that although the packaged module 800 is described in the context of electrical connections based on wirebonds, one or more features of the present disclosure can also be implemented in other packaging configurations, including, for example, flip-chip configurations.

Figure 11:
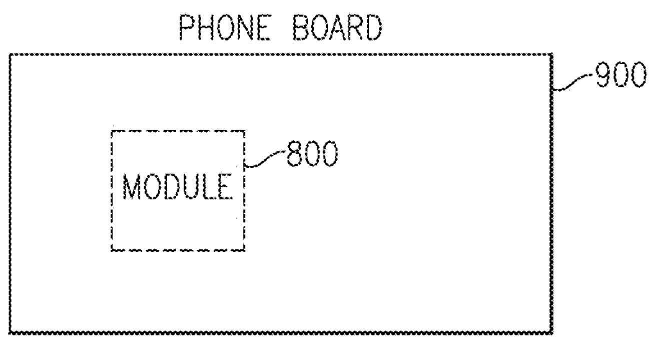
FIG. 11 is a schematic diagram of a phone board in accordance with certain embodiments.

FIG. 11 is a schematic diagram of a phone board 900 in accordance with certain embodiments. The phone board 900 includes the module 800 shown in FIGS. 10A-10B attached thereto. Although not illustrated in FIG. 11 for clarity, the phone board 900 can include additional components and structures.

Applications

Some of the embodiments described above have provided examples in connection with wireless devices or mobile phones. However, the principles and advantages of the embodiments can be used for any other systems or apparatus that have needs for power amplifiers.

Such envelope trackers can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency switch module configured to receive a radio frequency signal and provide a tuned version of the radio frequency signal, the radio frequency switch module comprising:

an input circuit configured to receive the radio frequency signal and route the radio frequency signal to a path determined based at least in part on a control signal received via a first control port of the input circuit;

an output circuit configured to detect the radio frequency signal transmitted through the path based at least in part on the control signal that is received via a second control port of the output circuit and output the tuned version of the radio frequency signal, the second control port being electrically coupled to the first control port such that the control signal is applied to both the first control port and the second control port; and a plurality of traces configured to provide a plurality of paths configured to transmit radio frequency signals between the input circuit and the output circuit, the plurality of paths including the path determined based at least in part on the control signal, each of the input circuit and the output circuit includes a plurality of switching pins to which the plurality of traces is connected, a first portion of the plurality of switching pins is positioned in series on a first side of the input circuit that is opposite to a second side of the input circuit that includes a second portion of the plurality of switching pins.

2. The radio frequency switch module of claim 1 wherein each of the first control port and the second control port includes a plurality of control pins, and each control pin of the first control port is electrically coupled to a corresponding control pin of the second control port respectively without traces of the plurality of traces overlapping.

3. The radio frequency switch module of claim 2 wherein the control signal includes a plurality of binary values, each of which is applied to one of the plurality of control pins of the first control port and a corresponding control pin of the plurality of control pins of the second control port.

4. The radio frequency switch module of claim 3 wherein the path through which the radio frequency signal is transmitted from the input circuit to the output circuit is determined by a combination of the plurality of binary values defined in a truth table.

5. The radio frequency switch module of claim 4 wherein each of the first control port and the second control port further includes a selection pin that is configured to select the truth table from a plurality of truth tables.

6. The radio frequency switch module of claim 1 wherein each of the input circuit and the output circuit further includes at least one power supply pin.

7. The radio frequency switch module of claim 1 wherein the plurality of traces is configured to connect each of the plurality of switching pins of the input circuit with a corresponding switching pin of the plurality of switching pins of the output circuit without traces of the plurality of traces overlapping.

8. A radio frequency switch module configured to receive a radio frequency signal and provide a tuned version of the radio frequency signal, the radio frequency switch module comprising:

an input circuit configured to receive the radio frequency signal and route the radio frequency signal to a path determined based at least in part on a control signal received via a first control port of the input circuit;

an output circuit configured to detect the radio frequency signal transmitted through the path based at least in part on the control signal that is received via a second control port of the output circuit and output the tuned version of the radio frequency signal, the second control port being electrically coupled to the first control port such that the control signal is applied to both the first control port and the second control port; and a plurality of traces configured to provide a plurality of paths configured to transmit radio frequency signals between the input circuit and the output circuit, the plurality of paths including the path determined based at least in part on the control signal, each of the first control port and the second control port includes a plurality of control pins, each control pin of the first control port is electrically coupled to a corresponding control pin of the second control port respectively without traces of the plurality of traces overlapping, and a number of control pins of the first control port and the second control port corresponds to a number of the plurality of traces.

9. The radio frequency switch module of claim 8 wherein each of the input circuit and the output circuit includes a plurality of switching pins to which the plurality of traces is connected, a first portion of the plurality of switching pins is positioned in series on a first side of the input circuit that is opposite to a second side of the input circuit that includes a second portion of the plurality of switching pins.

10. A front-end module comprising:

a packaging substrate configured to receive a plurality of components; and a radio frequency switch implemented on the packaging substrate, the radio frequency switch including an input circuit configured to receive a radio frequency signal and route the radio frequency signal to a path determined based at least in part on a control signal received via a first control port of the input circuit, an output circuit configured to detect the radio frequency signal transmitted through the path based at least in part on the control signal received via a second control port of the output circuit and output a tuned version of the radio frequency signal, the second control port being electrically coupled to the first control port such that the control signal is applied to both the first control port and the second control port, and a plurality of traces configured to provide a plurality of paths configured to transmit radio frequency signals between the input circuit and the output circuit, the plurality of paths including the path determined based at least in part on the control signal, each of the input circuit and the output circuit includes a plurality of switching pins to which the plurality of traces is connected, a first portion of the plurality of switching pins is positioned in series on a first side of the input circuit that is opposite to a second side of the input circuit that includes a second portion of the plurality of switching pins.

11. The front-end module of claim 10 wherein each of the first control port and the second control port includes a plurality of control pins, and each control pin of the first control port is electrically coupled to a corresponding control pin of the second control port respectively without traces of the plurality of traces overlapping.

12. The front-end module of claim 11 wherein the control signal includes a plurality of binary values, each of which is applied to one of the plurality of control pins of the first control port and a corresponding control pin of the plurality of control pins of the second control port.

13. The front-end module of claim 12 wherein the path through which the radio frequency signal is transmitted from the input circuit to the output circuit is determined by a combination of the plurality of binary values specified in a truth table.

14. The front-end module of claim 10 wherein the plurality of traces is configured to connect each of the plurality of switching pins of the input circuit with a corresponding switching pin of the plurality of switching pins of the output circuit without traces of the plurality of traces overlapping.

15. A front-end module comprising:

a packaging substrate configured to receive a plurality of components; and a radio frequency switch implemented on the packaging substrate, the radio frequency switch including an input circuit configured to receive a radio frequency signal and route the radio frequency signal to a path determined based at least in part on a control signal received via a first control port of the input circuit, an output circuit configured to detect the radio frequency signal transmitted through the path based at least in part on the control signal received via a second control port of the output circuit and output a tuned version of the radio frequency signal, the second control port being electrically coupled to the first control port such that the control signal is applied to both the first control port and the second control port, and a plurality of traces configured to provide a plurality of paths configured to transmit radio frequency signals between the input circuit and the output circuit, the plurality of paths including the path determined based at least in part on the control signal, each of the first control port and the second control port includes a plurality of control pins, and each control pin of the first control port is electrically coupled to a corresponding control pin of the second control port respectively without traces of the plurality of traces overlapping, the control signal includes a plurality of binary values, each of which is applied to one of the plurality of control pins of the first control port and a corresponding control pin of the plurality of control pins of the second control port, the path through which the radio frequency signal is transmitted from the input circuit to the output circuit is determined by a combination of the plurality of binary values specified in a truth table, and each of the first control port and the second control port further includes a selection pin that is configured to select the truth table from a plurality of truth tables.

16. The front-end module of claim 15 wherein each of the input circuit and the output circuit includes a plurality of switching pins to which the plurality of traces is connected, a first portion of the plurality of switching pins is positioned in series on a first side of the input circuit that is opposite to a second side of the input circuit that includes a second portion of the plurality of switching pins.

17. A base station comprising:

a transceiver configured to generate a radio frequency signal;

a power amplifier configured to amplify the radio frequency signal to obtain an amplified radio frequency signal;

an antenna; and a radio frequency switch configured to selectively electrically connect an output of the power amplifier to the antenna, the radio frequency switch including an input circuit configured to receive the amplified radio frequency signal and route the amplified radio frequency signal to a path determined based at least in part on a control signal received via a first control port of the input circuit, an output circuit configured to detect the amplified radio frequency signal transmitted through the path based at least in part on the control signal that is received via a second control port of the output circuit and output a tuned version of the amplified radio frequency signal, the second control port being electrically coupled to the first control port such that the control signal is applied to both the first control port and the second control port, and a plurality of traces configured to provide a plurality of paths configured to transmit radio frequency signals between the input circuit and the output circuit, the plurality of paths including the path determined based at least in part on the control signal, each of the first control port and the second control port includes a plurality of control pins, and each control pin of the first control port is electrically coupled to a corresponding control pin of the second control port respectively without traces of the plurality of traces overlapping.

18. The base station of claim 17 wherein the control signal includes a plurality of binary values, each of which is applied to one of the plurality of control pins of the first control port and a corresponding control pin of the plurality of control pins of the second control port.

19. The base station of claim 18 wherein the path through which the radio frequency signal is transmitted from the input circuit to the output circuit is determined by a combination of the plurality of binary values specified in a truth table selected from a plurality of truth tables based at least in part on a control signal received at a selection pin of the first control port and a selection pin of the second control port.

20. The base station of claim 17 wherein a number of control pins of the first control port and the second control port corresponds to a number of the plurality of traces.

* * * * *